United States Patent
Kim et al.

(10) Patent No.: US 10,273,348 B2
(45) Date of Patent: Apr. 30, 2019

(54) GLASS FIBER-REINFORCED POLYAMIDE 66 RESIN COMPOSITION WITH HIGH TENSILE STRENGTH AND METHOD OF MANUFACTURING THE SAME

(71) Applicant: DTR CO., Gyeongsangnam-do (KR)

(72) Inventors: Kwang Jea Kim, Gyeongsangnam-do (KR); Jong-Young Lee, Gyeongsangnam-do (KR); Sung Min Kim, Gyeongsangnam-do (KR); Jeong Hyeon Hwang, Gyeongsangnam-do (KR)

(73) Assignee: DTR CO., LTD., Gyeongsangnam-Do (KR)

( * ) Notice: Subject to any disclaimer, the term of this patent is extended or adjusted under 35 U.S.C. 154(b) by 45 days.

(21) Appl. No.: 15/244,476

(22) Filed: Aug. 23, 2016

(65) Prior Publication Data
US 2017/0058104 A1  Mar. 2, 2017

(30) Foreign Application Priority Data
Aug. 24, 2015  (KR) .......................... 10-2015-0119055

(51) Int. Cl.
| | | |
|---|---|---|
| *C08K 7/14* | (2006.01) | |
| *C08J 3/22* | (2006.01) | |
| *C08L 77/06* | (2006.01) | |
| *C08J 3/20* | (2006.01) | |
| *C08K 3/04* | (2006.01) | |
| *C08K 3/22* | (2006.01) | |
| *C08K 5/098* | (2006.01) | |
| *C08K 5/20* | (2006.01) | |
| *C08K 5/3465* | (2006.01) | |
| *C08K 5/3492* | (2006.01) | |
| *C08K 5/00* | (2006.01) | |
| *C08L 23/06* | (2006.01) | |
| *C08K 3/105* | (2018.01) | |

(52) U.S. Cl.
CPC ................ *C08K 7/14* (2013.01); *C08J 3/203* (2013.01); *C08J 3/226* (2013.01); *C08K 3/04* (2013.01); *C08K 3/105* (2018.01); *C08K 3/22* (2013.01); *C08K 5/0041* (2013.01); *C08K 5/098* (2013.01); *C08K 5/20* (2013.01); *C08K 5/3465* (2013.01); *C08K 5/34924* (2013.01); *C08L 23/06* (2013.01); *C08L 77/06* (2013.01); *C08J 2377/06* (2013.01); *C08J 2423/06* (2013.01); *C08K 2003/2296* (2013.01); *C08K 2201/003* (2013.01); *C08K 2201/004* (2013.01)

(58) Field of Classification Search
None
See application file for complete search history.

(56) References Cited

U.S. PATENT DOCUMENTS

| | | | | |
|---|---|---|---|---|
| 3,980,616 A | * | 9/1976 | Kimura | C08K 5/34924 524/100 |
| 5,100,941 A | | 3/1992 | Shigemoto et al. | |
| 6,262,221 B1 | | 7/2001 | Palmer | |
| 2001/0003762 A1 | * | 6/2001 | Miyabo | C08K 3/22 524/433 |
| 2007/0149658 A1 | * | 6/2007 | Hayashi | C08K 5/0041 524/89 |
| 2009/0081462 A1 | * | 3/2009 | Miyoshi | C08J 5/043 428/407 |
| 2011/0269880 A1 | * | 11/2011 | Pfaendner | C08K 5/134 524/140 |
| 2014/0288220 A1 | | 9/2014 | Duncan et al. | |
| 2015/0159015 A1 | | 6/2015 | Benighaus et al. | |

FOREIGN PATENT DOCUMENTS

| | | | |
|---|---|---|---|
| CN | 104610717 A | | 5/2015 |
| EP | 1 972 659 | * | 9/2008 |
| JP | 2009221479 A | | 10/2009 |
| JP | 2010202759 A | | 9/2010 |
| KR | 1020090062763 A | | 6/2009 |
| KR | 1020090087828 A | | 8/2009 |
| WO | 98/14510 A1 | | 4/1998 |
| WO | WO 2004/031282 | * | 4/2004 |
| WO | 2005/073320 A1 | | 8/2005 |
| WO | 2010/117708 A1 | | 10/2010 |
| WO | 2014/033665 A1 | | 3/2014 |
| WO | 2014/087354 A1 | | 6/2014 |
| WO | 2014/160564 A1 | | 10/2014 |

OTHER PUBLICATIONS

DuPont Product Information Sheet, "DuPont Zytel 101 NC010, Nylon Resin", Dec. 20, 2016, 9 pgs.

* cited by examiner

*Primary Examiner* — Robert T Butcher
(74) *Attorney, Agent, or Firm* — McNees Wallace & Nurick LLC

(57) ABSTRACT

A glass fiber-reinforced polyamide 66 resin composition with a high tensile strength of 260 MPa or more and a method of manufacturing the same are provided. The method of manufacturing the composition includes that 27.2 to 49% by weight of a polyamide 66 resin, 0.2 to 2% by weight of a dye mixture, 0.2 to 2% by weight of a compatibilizer, 0.1 to 3% by weight of an antioxidant, 0.1 to 3% by weight of a lubricant and 50 to 70% by weight of a glass fiber chopped strand are mixed in a twin screw extruder, the materials are extruded in the form of a strand by an extrusion die, and cooled to obtain a pellet-type glass fiber-reinforced polyamide 66 resin composition. The glass fiber-reinforced polyamide 66 resin composition is suitable for vehicular engine mounts due to excellent mechanical strength, and for parts requiring physical properties.

4 Claims, 2 Drawing Sheets

GLASS FIBER-REINFORCED POLYAMIDE 66 RESIN COMPOSITION WITH HIGH TENSILE STRENGTH AND METHOD OF MANUFACTURING THE SAME

CROSS-REFERENCE TO RELATED APPLICATION

This application claims under 35 U.S.C. § 119(a) the benefit of priority to Korean Patent Application No. 10-2015-0119055 filed on Aug. 24, 2015, the entire contents of which are incorporated herein by reference.

BACKGROUND (a) Technical Field

The present disclosure relates to a glass fiber-reinforced polyamide 66 resin composition and a method of manufacturing the same. More specifically, the present invention relates to a glass fiber-reinforced polyamide 66 resin composition which is used in the fields including vehicular engine mounts, requiring high tensile properties (tensile strength of 260 MPa or more) and provides excellent mechanical strength and heat resistance and a method of manufacturing the same.

(b) Background Art

An engine mount is a device that reduces vibrations of engines and transfers the same to a vehicle body and reduces vibrations generated on the road and then transferred through a vehicle body and transfers the same to engines. Engine mounts were generally produced using iron in the prior art, whereas they have been currently produced by die casting using aluminum. In addition, recently, as attention of environmental regulations associated with vehicles and weight reduction of vehicles to improve fuel efficiency thereof rapidly increases, engine mounts using plastics have been developed.

One of representative plastics used for engine mounts is a glass fiber-reinforced polyamide 66 resin composition. This composition has relatively high strength and heat resistance. However, the composition is a resin composition which is not developed to be optimized for engine mount applications, but is produced for general purposes. Thus, there is a need for development of resin compositions with high tensile strength of 260 MPa or more and high heat resistance which are specialized for engine mount applications. As the prior art, Japanese Patent Laid-open Publication No. 2009-221479 discloses a glass fiber-reinforced thermoplastic resin composition and addition of an antioxidant, lubricant, dye, pigment or the like to the thermoplastic resin. This patent discloses data associated with flexural properties and impact properties, but does not disclose data associated with tensile properties which are considered important in materials for engine mounts. In addition, U.S. Patent Application Publication No. U.S. 2009/0081462 discloses that zinc oxide can be used as a compatibilizer of a glass fiber-reinforced thermoplastic resin and that zinc stearate can be added as a lubricant, but does not disclose selection of additives and ratios thereof to obtain synergetic effects in order to improve tensile strength of the glass fiber and the polyamide 66 resin composition.

SUMMARY OF THE DISCLOSURE

The present invention has been made in an effort to solve the above-described problems associated with prior art.

Accordingly, as a result of research to improve physical properties of glass fiber-reinforced polyamide 66 resins, the present inventors developed a glass fiber-reinforced polyamide 66 resin which exhibits superior mechanical strength to conventional glass fiber-reinforced polyamide 66 resins developed across the world.

Accordingly, an object of the present invention is to provide a glass fiber-reinforced polyamide 66 resin composition which is suitable for use in the field requiring high tensile strength, in particular, vehicular engine mounts, due to excellent physical properties such as high tensile strength of 260 MPa or more, and excellent mechanical strength and heat resistance and is superior to conventional materials, and a method of manufacturing the same.

In one aspect, the present invention provides a glass fiber-reinforced polyamide 66 resin composition including 27.2 to 49% by weight of a polyamide 66 resin, 0.2 to 2% by weight of a dye mixture for coloring, 0.2 to 2% by weight of a zinc complex for improving physical properties, 0.1 to 3% by weight of a phenol-based antioxidant for preventing oxidation, 0.1 to 3% by weight of a stearamide-based lubricant and 50 to 70% by weight of a glass fiber chopped strand. The glass fiber-reinforced polyamide 66 resin composition is produced by mixing the ingredients of the composition in a twin screw extruder.

The polyamide 66 resin of Rhodia Corporation is available and preferably has a relative viscosity of 1.5 to 3.5 in a sulfuric acid solution. When the relative viscosity is less than the range, physical properties deteriorate and when the relative viscosity exceeds the range, surface defects and molding problems are caused by the glass fiber due to deterioration in flowability.

The glass fiber of Owens corning Corporation is available and is preferably a glass fiber coated with a silane-based sizing agent. In addition, the glass fiber preferably has a mean particle diameter of 6 μm to 15 μm and a mean length of 2 mm to 12 mm before extrusion. When the mean particle diameter and the mean length are less than the ranges, physical properties may deteriorate due to insufficient reinforcement effects and when the mean particle diameter and the mean length exceed the ranges, problems about mixing and workability may occur.

More specifically, the present invention utilizes additives optimized to produce a glass fiber-reinforced polyamide 66 resin composition with high tensile strength which exhibits high rigidity such as excellent tensile strength, tensile modulus, flexural strength and flexural modulus.

In the present invention, the antioxidant is preferably a phenol-based antioxidant. For example, the phenol-based antioxidant is 1,3,5-tris(2,6-dimethyl-3-hydroxy-4-tert-butylbenzyl)isocyanurate and a mixture thereof. This serves as a primary antioxidant which removes radicals generated by oxidation of the glass fiber-reinforced polyamide 66 resin composition. The antioxidant can protect plastics during use of processed or finished products.

Among the additives, the zinc-based complex serves as a reinforcing agent or a compatibilizer to improve physical properties. Examples of the zinc-based complex include (saturated or unsaturated) zinc soap, (saturated or unsaturated) fatty acid zinc, zinc oxide, zinc stearate, zinc borate, zinc laurate, zinc tartrate, zinc oleate, zinc sulfate, and a complex thereof.

The lubricant is preferably a stearamide-based lubricant. Specifically, the stearamide-based lubricant is, for example, an ethylene bis stearamide wax. This functions to improve flowability during processing of the glass fiber-reinforced polyamide 66 resin composition and dispersability of the glass fiber.

The dye mixture may be a mixture of polyethylene and nigrosine. The dye mixture functions to apply a black color to the glass fiber-reinforced polyamide 66 resin composition. In addition, the addition of the dye mixture should not cause deterioration in physical properties. As an example to satisfy this requirement, the dye mixture may be a mixture of a dye and polyamide or polyolefin. The dye may be carbon black or nigrosine and may be present in an amount of 10 to 70% by weight. The polyamide may be polyamide 6 or polyamide 66, the polyolefin may be polyethylene or polypropylene and the polyamide or polyolefin may be present in an amount of 30 to 90% by weight.

In another aspect of the present invention, provided is a method of manufacturing a glass fiber-reinforced polyamide 66 resin composition with a high tensile strength (tensile strength of 260 MPa or more) including feeding 27.2 to 49% by weight of a polyamide 66 resin, 0.2 to 2% by weight of a dye mixture for coloring, 0.2 to 2% by weight of a zinc complex for improving physical properties, 0.1 to 3% by weight of a phenol-based antioxidant for preventing oxidation, 0.1 to 3% by weight of a stearamide-based lubricant and 50 to 70% by weight of a glass fiber chopped strand into a twin screw extruder, mixing the fed materials while maintaining a temperature of the twin screw extruder at 260° C. to 300° C., extruding the materials mixed by the twin screw extruder in the form of a strand by an extrusion die, and cooling the extrudate in a cooling bath.

The glass fiber-reinforced polyamide 66 resin composition according to the present invention can be produced using a twin screw extruder (diameter (φ): 31.6 mm, a ratio of length and diameter (L/D): 60). The twin screw extruder is operated by an intermeshing modular co-rotating method. The twin screw extruder has a diameter of 27 mm to 120 mm. The twin screw extruder is composed of a suitable combination of screws including a conveying screw element, a kneading screw element and a reverse screw element. Two vents (not shown) are provided to remove moisture and gases generated during processing.

The resin, additives and glass fiber are respectively fed in set ratios by a weight feeder (gravimetric). The polyamide 66, the additives and the glass fiber are separately fed by a main feeder, a side feeder-1 and a side feeder-2, respectively, and are then mixed in the extruder.

In order to facilitate mixing and workability between the polyamide 66, various additives and glass fiber in the extruder, temperatures were separately set for a total of 14 barrels. The temperatures of the respective parts of the extruder barrels are preferably maintained within the range of 260° C. to 300° C. An ejection amount was set at 40 kg per hour so that a pressure of the extrusion die was induced within the range of about 10 bar to 20 bar, preferably, 15 bar. This is because both mixing problems caused by excessively low pressure and problems such as fracture or melt fracture of the glass fiber caused by excessively high pressure are prevented.

The extruded material is cooled in the form of a strand in the cooling bath, moisture on the surface is removed by an air wiper and the material is cut into a size of 3 to 5 mm and thus pelletized by a pelletizer.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

Figure 2:
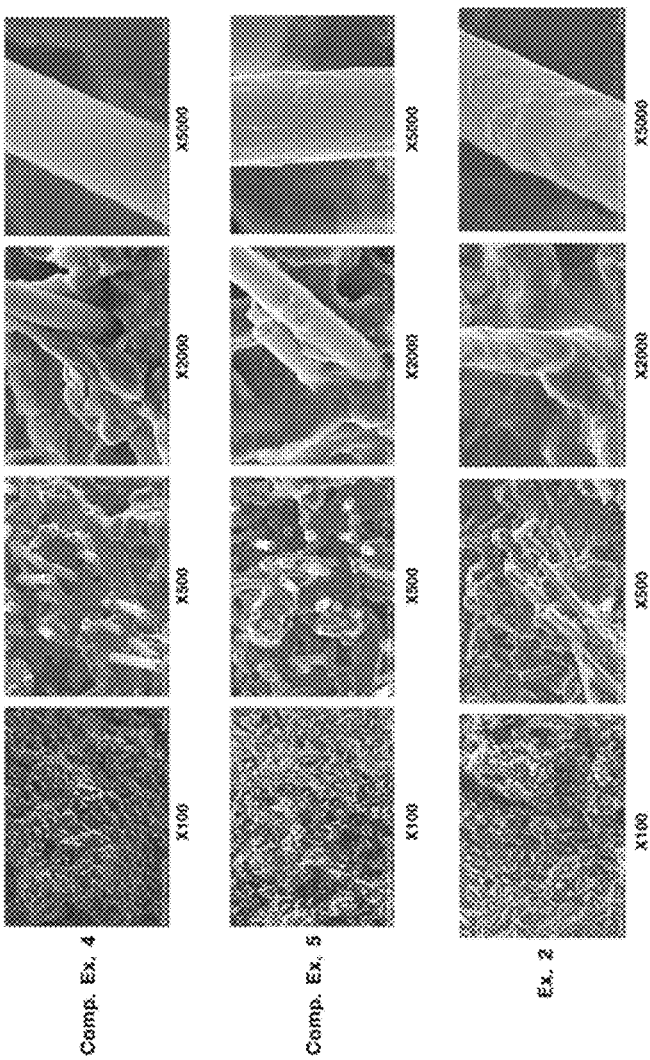

FIG. 2 shows the boundary states between the glass fiber and the polyamide 66 resin of Example 2, Comparative Example 4, and Comparative Example 5.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, preferred embodiments of the present invention will be described in detail.

Figure 1:
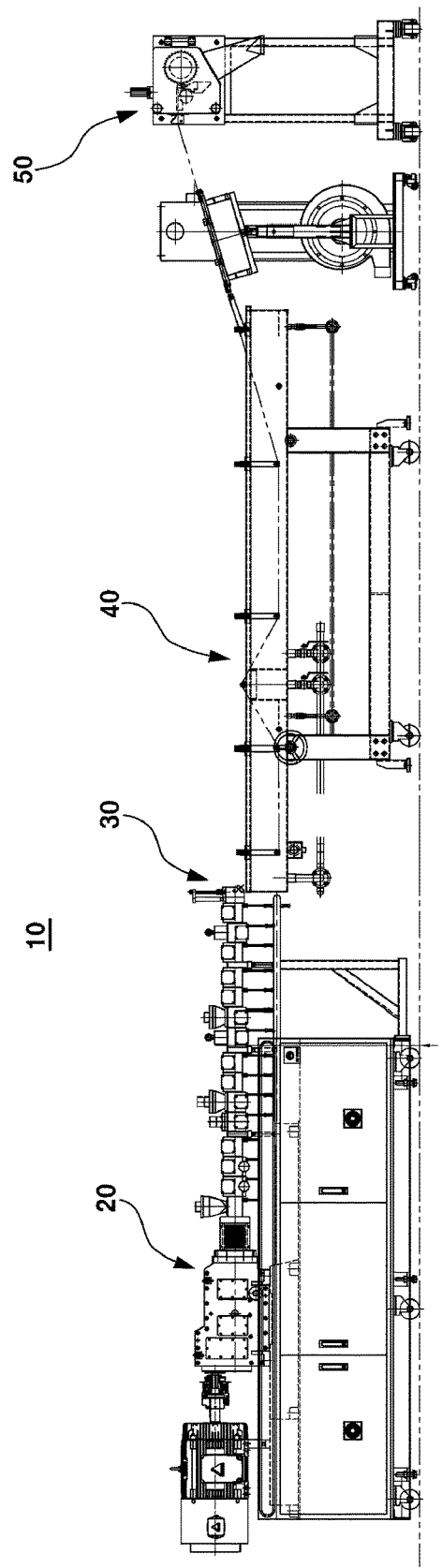
FIG. 1 shows an overall configuration of a twin screw extruder to produce a glass fiber-reinforced polyamide 66 resin composition according to the present invention.

In the present invention, a twin screw extruder (φ31.6, ratio of length and diameter: 60) is used to prepare a glass fiber-reinforced polyamide 66 resin composition. FIG. 1 is a schematic view illustrating a twin screw extruder 10. In FIG. 1, the reference numeral "20" represents a twin screw extruder, the reference numeral "30" represents an extrusion die, the reference numeral "40" represents a cooling bath and the reference numeral "50" represents a pelletizer. The twin screw extruder 20 mixes a melted polyamide 66 resin, a glass fiber and various additives, and then extrudes the same. The die 30 functions to produce strands of the glass fiber-reinforced polyamide 66 resin composition. The cooling bath 40 is a water-cooling type cooler which cools the strands and the pelletizer 50 cuts the strands to produce pellets with a size of 3 mm to 5 mm.

The twin screw extruder 20 is operated by an intermeshing modular co-rotating method. The twin screw extruder 20 is composed of a suitable combination of screws including a conveying screw element, a kneading screw element and a reverse screw element. Two vents (not shown) are provided to remove moisture and gases generated during processing.

A polyamide 66 resin, additives [dye mixture, compatibilizer (zinc-based complex), antioxidant and lubricant], and a glass fiber were fed in set ratios (ratios of Examples and Comparative Examples described below) by a weight feeder (gravimetric). The polyamide 66 was fed by a main feeder, the additives were fed by a side feeder-1 and the glass fiber was fed by a side feeder-2.

In order to facilitate mixing and processability between the polyamide 66, various additives and glass fiber in the twin screw extruder 20, different temperatures were separately set at a total of 14 barrels. The temperature conditions of the respective parts are listed in the following Table 1. In this case, a through-put amount was set at 40 kg per hour so that a pressure of the extrusion die 30 could be induced within the range of about 10 bar to 20 bar. When the pressure of the extrusion die 30 is excessively low, disadvantageously, mixing cannot be smoothly conducted, and when the pressure thereof is excessively high, problems such as fracture or melt fracture of the glass fiber occur. Accordingly, a pressure was maintained at a suitable level to prevent these problems.

TABLE 1

| Items | Barrel 1 | Barrel 2 | Barrel 3 | Barrel 4 | Barrel 5 | Barrel 6 | Barrel 7 | Barrel 8 |
|---|---|---|---|---|---|---|---|---|
| Temperature (° C.) | 270 | 275 | 280 | 280 | 280 | 280 | 280 | 280 |

| Items | Barrel 9 | Barrel 10 | Barrel 11 | Barrel 12 | Barrel 13 | Barrel 14 | Die |
|---|---|---|---|---|---|---|---|
| Temperature (° C.) | 280 | 275 | 270 | 270 | 270 | 270 | 280 |

The material extruded by the twin screw extruder 20 was produced into a strand by the extrusion die 30 and cooled in the cooling bath 40. Then, moisture on the surface was removed by an air wiper and the material was cut into a size of 3 mm to 5 mm by the pelletizer 50. Then, the material was dried by a drier (not shown) such that moisture was present in an amount of 0.5% or less in the material. The material obtained by such a process was a pellet produced from the glass fiber-reinforced polyamide 66 resin composition according to the present invention.

The dried material was produced into a specimen using a φ30 injector with an injection pressure of 1,920 kg/cm$^2$ in order to produce the specimen for ISO test and contamination thereof was prevented by sufficient purging.

The temperature conditions of respective parts during processing are listed in the following Table 2. A temperature control unit was mounted on a mold and the temperature of the mold was increased to facilitate filling the material in the mold.

During metering, the back pressure was set at 10 bar and, during injection, the maximum injection pressure was set at 70 bar and the holding pressure was set at 55 bar. The cooling time was set at 25 seconds so that cooling was sufficient.

TABLE 2

| Items | Rear zone | Middle zone | Front zone | Nozzle | Mold |
|---|---|---|---|---|---|
| Temperature (° C.) | 275 | 285 | 290 | 295 | 85 |

The present invention will be described in more detail with reference to examples, but the present invention is not limited thereto.

Glass fiber-reinforced polyamide 66 resin compositions were prepared in ratios shown in Tables 3 to 5 under the process conditions described above using the twin screw extruder 10. The same conditions were applied to prepare the glass fiber-reinforced polyamide 66 resin compositions according to Examples and Comparative Examples.

TABLE 3

| | | Content (wt %) | | | | | | | | | | |
|---|---|---|---|---|---|---|---|---|---|---|---|---|
| Items | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| Polyamide | PA66-1 | 48.9 | — | — | — | — | — | — | — | — | — | — |
| | PA66-2 | — | 48.9 | 49 | 46.3 | 46.1 | 47.1 | 43.7 | 38.7 | 33.2 | 33.6 | 27.2 |

TABLE 3-continued

|  | Content (wt %) | | | | | | | | | | |
|---|---|---|---|---|---|---|---|---|---|---|---|
| Items | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| Glass fiber | 50 | 50 | 50 | 50 | 50 | 50 | 55 | 60 | 65 | 65 | 70 |
| Compatibilizer | 0.3 | 0.3 | 0.2 | 0.3 | 0.3 | 0.3 | 0.5 | 0.5 | 1 | 1 | 2 |
| Antioxidant | 0.4 | 0.4 | 0.4 | 3 | 0.4 | 0.4 | 0.4 | 0.4 | 0.4 | 0.1 | 0.4 |
| Lubricant | 0.2 | 0.2 | 0.2 | 0.2 | 3 | 0.2 | 0.2 | 0.2 | 0.2 | 0.1 | 0.2 |
| Dye mixture | 0.2 | 0.2 | 0.2 | 0.2 | 0.2 | 2 | 0.2 | 0.2 | 0.2 | 0.2 | 0.2 |

1) PA66(1): Rhodia Corporation, Stabamid, medium viscosity (Sulfuric acid method, relative viscosity: 2.7)
2) PA66(2): Rhodia Corporation, Stabamid, low viscosity (Sulfuric acid method, relative viscosity: 2.4)
3) Glass fiber: Owens corning Corporation, mean particle diameter: 10 microns, fiber length: 4 mm
4) Compatibilizer: zinc complex [(saturated, unsaturated) zinc soap, (saturated, unsaturated) fatty acid zinc, zinc oxide, zinc stearate, zinc borate, zinc laurate, zinc tartrate, zinc oleate, zinc sulfate, or a complex thereof]
5) Antioxidant: 1,3,5-tris(2,6-dimethyl-3-hydroxy-4-tert-butylbenzyl)isocyanurate and a mixture thereof
6) Lubricant: ethylene bis stearamide wax
7) Dye mixture: a mixture of polyethylene 30 wt % and nigrosine 70 wt %

TABLE 4

|  |  | Content (wt %) | | | | | |
|---|---|---|---|---|---|---|---|
| Items | | Comp. Ex. 1 | Comp. Ex. 2 | Comp. Ex. 3 | Comp. Ex. 4 | Comp. Ex. 5 | Comp. Ex. 6 |
| Polyamide | PA66-1 | — | — | 49.2 | — | — | — |
|  | PA66-2 | 53.9 | 23.2 | — | 49.2 | 49.1 | 46.7 |
| Glass fiber | | 45 | 75 | 50 | 50 | 50 | 50 |
| Compatibilizer | | 0.3 | 1 | — | — | 0.1 | 2.5 |
| Antioxidant | | 0.4 | 0.4 | 0.4 | 0.4 | 0.4 | 0.4 |
| Lubricant | | 0.2 | 0.2 | 0.2 | 0.2 | 0.2 | 0.2 |
| Dye mixture | | 0.2 | 0.2 | 0.2 | 0.2 | 0.2 | 0.2 |

TABLE 5

|  |  | Content (wt %) | | | | | |
|---|---|---|---|---|---|---|---|
| Items | | Comp. Ex. 7 | Comp. Ex. 8 | Comp. Ex. 9 | Comp. Ex. 10 | Comp. Ex. 11 | Comp. Ex. 12 |
| polyamide | PA66-2 | 49.3 | 45.8 | 49.1 | 45.6 | 49 | 45.6 |
| Glass fiber | | 50 | 50 | 50 | 50 | 50 | 50 |
| Compatibilizer | | 0.3 | 0.3 | 0.3 | 0.3 | 0.3 | 0.3 |
| Antioxidant | | — | 3.5 | 0.4 | 0.4 | 0.4 | 0.4 |
| Lubricant | | 0.2 | 0.2 | — | 3.5 | 0.2 | 0.2 |
| Dye mixture | | 0.2 | 0.2 | 0.2 | 0.2 | 0.1 | 3.5 |

(1) Evaluation Method

Specimens of the glass fiber-reinforced polyamide 66 resin compositions prepared in Examples and Comparative Examples were produced and physical properties thereof were measured.

1) Tensile strength: ISO-527 (unit MPa), test speed: 50 mm/min

The specimen was drawn such that a load was uniformly applied to a cross-section of the specimen and a maximum tensile stress was measured when the specimen was broken.

2) Tensile modulus: ISO-527 (unit MPa), test speed: 1 mm/min

Strain compared to stress was linearly changed in an area with a small strain (Hooke's law). In this area, a ratio of stress to strain (tensile stress/tensile strain) was calculated.

3) Flexural strength: ISO-178 (unit MPa), test speed: 2 mm/min

A maximum strength generated by the specimen when the specimen was pressed at a predetermined rate was measured.

4) Flexural modulus: ISO-178 (unit MPa), test speed: 2 mm/min

A ratio of force applied to the center of the specimen from the upside to a strain generated in the specimen was calculated.

5) Impact strength: ISO-179 (unit kJ/m$^2$), room-temperature notch Charpy impact test Impact strength was measured when hitting the center of an opposite side of a notch by a pendulum with a predetermined weight while supporting both sides of the specimen.

6) Outer appearance

The surface conditions of specimens were observed by the naked eye and evaluated by four grades of excellent, good, medium and bad.

7) Boundary condition

In order to demonstrate superiority of the present invention, the broken surface of the impacted specimen was observed using a scanning electron microscope to confirm the boundary between the glass fiber and the polyamide 66 resin, and the boundary condition was evaluated by three grades of excellent, good and bad.

(2) Evaluation of Physical Properties of the Glass Fiber-reinforced Polyamide 66 Resin Compositions Depending on a Glass Fiber Content.

TABLE 6

| Items (ISO) | Ex. 1 | Ex. 2 | Ex. 7 | Ex. 8 | Ex. 9 | Ex. 11 | Comp. Ex. 1 | Comp. Ex. 2 |
|---|---|---|---|---|---|---|---|---|
| Tensile strength (MPa) | 267 | 271 | 276 | 285 | 278 | 262 | 244 | 258 |
| Tensile modulus (MPa) | 16550 | 16650 | 19050 | 22400 | 24800 | 28000 | 14560 | 29500 |
| Flexural strength (MPa) | 354 | 360 | 365 | 374 | 377 | 348 | 333 | 353 |
| Flexural modulus (MPa) | 14470 | 14580 | 16570 | 17760 | 19500 | 20750 | 12001 | 19500 |
| Impact strength (KJ/m$^2$) | 13.5 | 12.9 | 12.8 | 12.6 | 11.4 | 9.2 | 11.94 | 12.5 |
| Outer appearance | Good | Good | Good | Good | medium | medium | Excellent | Bad |
| Die pressure (bar) | 15 | 15 | | | | | — | — |
| Screw torque (A) | 50 | 50 | | | | | — | — |
| Boundary condition | — | Excellent | | | | | — | — |

Table 6 shows evaluation results of physical properties of Examples 1, 2, 7, 8, 9 and 11 and Comparative Examples 1 and 2. Table 6 shows variation in physical properties of the glass fiber-reinforced polyamide 66 resin compositions depending on variation in contents of the polyamide 66 resin and glass fiber.

The evaluation results of physical properties of Examples 1, 2, 7, 8, 9 and 11 shown in Table 6 indicate that the physical property such as high tensile strength (tensile strength of 260 MPa) can be obtained when the content of glass fiber is within the range of 50 to 70% by weight.

As the content of glass fiber increases, tensile strength and flexural strength of the glass fiber-reinforced polyamide 66 resin composition increase. In addition, as the content of glass fiber increases from 50% by weight (Examples 1 and 2) to 75% by weight (Comparative Example 2), tensile modulus and flexural modulus continuously increase. However, the most important physical properties, i.e., tensile strength, flexural strength and impact strength rather deteriorate when the content of glass fiber is 75% by weight (Comparative Example 2), compared with when the content of glass fiber is 50% by weight (Examples 1 and 2). Furthermore, as the content of glass fiber increases, the glass fiber is further protruded and outer appearance thus deteriorates. Thus, improvement of physical properties based on an increase in a glass fiber content is meaningful only under the condition that the content of glass fiber is about 70% by weight or less. Some physical properties may deteriorate, when the content of glass fiber exceeds the range.

(3) Physical Properties of Glass Fiber-Reinforced Polyamide 66 Resin Composition Depending on a Compatibilizer Content

TABLE 7

| Items (ISO) | Ex. 3 | Comp. Ex. 3 | Comp. Ex. 4 | Comp. Ex. 5 | Comp. Ex. 6 |
|---|---|---|---|---|---|
| Tensile strength (MPa) | 262 | 255 | 257 | 258 | 252 |
| Tensile modulus (MPa) | 16300 | 16100 | 16250 | 16200 | 15300 |
| Flexural strength (MPa) | 347 | 340 | 343 | 345 | 340 |
| Flexural modulus (MPa) | 14150 | 14000 | 14030 | 14100 | 14750 |
| Impact strength (KJ/m$^2$) | 12.1 | 12.4 | 11.8 | 12.5 | 12.4 |

TABLE 7-continued

| Items (ISO) | Ex. 3 | Comp. Ex. 3 | Comp. Ex. 4 | Comp. Ex. 5 | Comp. Ex. 6 |
|---|---|---|---|---|---|
| Boundary condition | Good | Bad | Bad | — | — |

By comparing evaluation results of Examples 1, 2 and 3 and Comparative Examples 3, 4, 5 and 6, variations in physical properties of the glass fiber-reinforced polyamide 66 resin compositions depending on the compatibilizer content can be seen.

Comparing evaluation results of Examples 1 and 2 shown in Table 6 with evaluation results of Comparative Examples 3 and 4 shown in Table 7, in the same composition, Examples 1 and 2 in which 0.3% by weight of a zinc complex is contained, instead of 0.3% by weight of the polyamide 66 resin, exhibited better tensile strength and tensile modulus, flexural strength, flexural modulus and flexural strength, than Comparative Examples 3 and 4 in which zinc complex is not contained. This means that the zinc complex greatly contributes to improvement in physical properties of the glass fiber-reinforced polyamide 66 resin composition under the same composition conditions.

In addition, as can be seen from evaluation results of Example 3 and evaluation results of Comparative Examples 5 and 6 shown in Table 7, when the zinc complex is added in an amount of 0.1% by weight (Comparative Example 5), the function of the compatibilizer may be slightly and insufficiently performed and when it is added in an amount of 0.2% by weight (Example 3), the function of compatibilizer can be sufficiently performed. As the amount of zinc complex increases, the zinc complex contributes to overall improvement of physical properties (see Example 2 of Table 6). But, when the zinc complex is present in an amount of 2.5% by weight (Comparative Example 6), improvement of physical properties is considerably slight or physical properties deteriorate, as compared to when the zinc complex is present in a less amount (see evaluation of physical properties of Example 2).

In addition, the boundary states between the glass fiber and the polyamide 66 resin of Example 2, Comparative Example 4 and Comparative Example 5 were confirmed using a scanning electron microscope, as shown in Drawing 1. In Comparative Example 4 regarding a composition of a glass fiber and a polyamide 66 resin, which is not treated with zinc complex, voids are present on the boundary between the glass fiber and the polyamide 66 resin, and adhesion of the polyamide 66 resin to the surface of the glass fiber is insufficient. In Comparative Example 5, voids present on the boundary between the glass fiber and the polyamide 66 resin are less and adhesion of polyamide 66 to the surface of the glass fiber is better than in Comparative Example 4. In Example 2, voids on the boundary between the glass fiber and the polyamide 66 resin are the least, as compared to Comparative Examples 4 and 5, and adhesion of the polyamide 66 resin to the surface of the glass fiber is stronger, as compared to Comparative Example 5.

As can be seen from the drawing above, the zinc complex is preferably present in an amount of about 0.2 to 2% by weight.

(4) Physical Properties of Glass Fiber-reinforced Polyamide 66 Resin Composition Depending on Contents of Other Additives added in an amount of 0.1% by weight in the same composition, overall physical properties are similar to the case of Example 2, but outer appearance is slightly insufficient due to color problem. On the other hand, when the content of dye mixture is 3.5% by weight, outer appearance is excellent, but overall physical properties deteriorate. Problems of outer appearance and color can be prevented when the dye mixture is present in an amount of 0.2 to 2% by weight, as can be seen from evaluation results of Example 2 shown in Table 6 and Example 6 shown in Table 8.

As is apparent from the above description, the glass fiber-reinforced polyamide 66 resin composition according to the present invention has much superior tensile strength to conventional products. In addition, the glass fiber-reinforced polyamide 66 resin composition exhibits excellent other physical properties such as tensile modulus, flexural strength, flexural modulus and impact strength. Due to

TABLE 8

| Items (ISO) | Ex. 4 | Ex. 5 | Ex. 6 | Ex. 10 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|
| Tensile strength (MPa) | 263 | 261 | 260 | 265 | 258 | 250 | 255 | 245 | 259 | 255 |
| Tensile modulus (MPa) | 16614 | 16625 | 16258 | 23686 | 16600 | 16800 | 16550 | 15729 | 16650 | 15970 |
| Flexural strength (MPa) | 348 | 351 | 341 | 369 | 351 | 338 | 352 | 333 | 352 | 345 |
| Flexural modulus (MPa) | 14138 | 14034 | 13758 | 19760 | 14580 | 15450 | 14550 | 13400 | 14550 | 14100 |
| Impact strength (KJ/m$^2$) | 11.4 | 12.4 | 11.3 | 10.3 | 12.7 | 11.2 | 12.6 | 10.9 | 12.5 | 11.3 |
| Outer appearance | Good | Good | Good | Medium | — | — | — | — | Bad | Excellent |
| Die pressure (bar) | | 12 | | | — | — | 19 | 11 | — | — |
| Screw torque (A) | | 48 | | | — | — | 56 | 47 | — | — |

By comparing Examples 2, 4 and 10 and Comparative Examples 7 and 8, variation in physical properties of the polyamide 66 resin composition depending on the amount of the antioxidant used in the same composition except the polyamide 66 resin and the antioxidant can be seen.

Comparing evaluation results of Example 2 shown in Table 6 with evaluation results of Comparative Examples 7 and 8 shown in Table 8, the most excellent physical properties are obtained when the content of the antioxidant is 0.4% by weight, the effect of antioxidant cannot be expected when the content of the antioxidant is less than 0.1% by weight, and overall physical properties such as tensile strength, flexural strength, flexural modulus and impact strength deteriorate when the content of antioxidant is increased to 3.5% by weight, which is higher than 3% by weight. The evaluation results of Examples 4 and 10 shown in Table 8 show that the content of antioxidant is preferably about 0.1 to 3% by weight.

In addition, evaluation results of Comparative Examples 9 and 10 shown in Table 8 show that, when the lubricant is added in an amount of less than 0.1% by weight in the same composition, processing problems such as increased die pressure and increased screw torque occur, and when the lubricant is added in an amount of 3.5% by weight, overall physical properties deteriorate.

The processing problems and deterioration in physical properties do not almost occur when the lubricant is present in an amount of about 0.1 to 3% by weight, as can be seen from evaluation results of Examples 5 and 10 of Table 8.

The evaluation results of Comparative Examples 11 and 12 shown in Table 8 show that, when the dye mixture is characteristic advantages of physical properties, the glass fiber-reinforced polyamide 66 resin composition according to the present invention is particularly suitable as a material for vehicular engine mounts, requiring physical properties such as high tensile strength. In addition, the glass fiber-reinforced polyamide 66 resin composition can be variably applied to the fields requiring high mechanical strength and heat resistance.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:
1. A glass fiber-reinforced polyamide 66 resin composition with a high tensile strength of 270 MPa or more comprising:
  27.2 to 49% by weight of a polyamide 66 resin;
  0.2 to 2% by weight of a dye mixture;
  0.2 to 2% by weight of a compatibilizer;
  0.1 to 3% by weight of an antioxidant comprising 1,3,5-tris(2,6-dimethyl-3-hydroxy-4-tert-butylbenzyl)isocyanurate;
  0.1 to 3% by weight of a lubricant comprising an ethylene bis stearamide wax; and
  50 to 70% by weight of a glass fiber chopped strand,
  wherein the compatibilizer is a zinc-based complex, and the zinc-based complex comprises at least one of zinc soap, fatty acid zinc, zinc oxide, zinc stearate, zinc borate, zinc laurate, zinc tartrate, zinc oleate, zinc sulfate, and a mixture of at least a part thereof, the polyamide 66 resin has a relative viscosity of 1.5 to 2.4 in a sulfuric acid solution, the glass fiber has a mean particle diameter of 6µm to 15 µm and a mean length of 2 mm to 12 mm, the dye mixture is a mixture of 10 to 70% by weight of a dye and 30 to 90% by weight of polyethylene, and the dye comprises carbon black or nigrosine.

2. A method of manufacturing a glass fiber-reinforced polyamide 66 resin composition with a high tensile strength of 270 MPa or more, comprising:

feeding 27.2 to 49% by weight of a polyamide 66 resin, 0.2 to 2% by weight of a dye mixture, 0.2 to 2% by weight of a compatibilizer, 0.1 to 3% by weight of an antioxidant comprising 1,3,5-tris(2,6-dimethyl-3-hydroxy-4-tert-butylbenzyl)isocyanurate, 0.1 to 3% by weight of a lubricant comprising an ethylene bis stearamide wax and 50 to 70% by weight of a glass fiber chopped strand into a twin screw extruder;

mixing the materials fed into the twin screw extruder while maintaining a temperature of the twin screw extruder at 260° C. to 300° C.;

extruding the materials mixed by the twin screw extruder in a form of a strand by an extrusion die; and cooling the extruded materials in a cooling bath, wherein the compatibilizer in the feeding step is a zinc-based complex and the zinc-based complex comprises at least one of zinc soap, fatty acid zinc, zinc oxide, zinc stearate, zinc borate, zinc laurate, zinc tartrate, zinc oleate, zinc sulfate, and a mixture of at least a part thereof, the polyamide 66 resin has a relative viscosity of 1.5 to 2.4 in a sulfuric acid solution, the glass fiber has a mean particle diameter of 6 µm to 15 µand a mean length of 2 mm to 12 mm, the dye mixture is a mixture of 10 to 70% by weight of a dye and 30 to 90% by weight of polyethylene, and the dye comprises carbon black or nigrosine.

3. The method of claim 2, wherein 38.7 to 48.9% by weight of the polyamide 66 resin is fed into the twin screw extruder.

4. The composition of claim 1, wherein the polyamide 66 resin is present in the amount of 38.7 to 48.9% by weight.

\* \* \* \* \*